(12) United States Patent
Tsukamoto et al.

(10) Patent No.: US 9,077,265 B2
(45) Date of Patent: Jul. 7, 2015

(54) MOTOR CONTROL DEVICE

(75) Inventors: Takeo Tsukamoto, Isesaki (JP);
Daisuke Hirono, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 22 days.

(21) Appl. No.: 13/985,860

(22) PCT Filed: Feb. 8, 2012

(86) PCT No.: PCT/JP2012/052847
§ 371 (c)(1),
(2), (4) Date: Aug. 15, 2013

(87) PCT Pub. No.: WO2012/111504
PCT Pub. Date: Aug. 23, 2012

(65) Prior Publication Data
US 2013/0320890 A1    Dec. 5, 2013

(30) Foreign Application Priority Data
Feb. 15, 2011    (JP) ................. 2011-029813

(51) Int. Cl.
*H02P 21/00*    (2006.01)
*H02P 6/00*    (2006.01)
*H02P 6/18*    (2006.01)
*H02P 27/08*    (2006.01)

(52) U.S. Cl.
CPC *H02P 6/001* (2013.01); *H02P 6/18* (2013.01); *H02P 27/08* (2013.01); *H02P 21/0042* (2013.01); *H02P 21/0035* (2013.01)

(58) Field of Classification Search
USPC ............... 318/400.02, 727, 798, 799, 801
See application file for complete search history.

(56) References Cited

U.S. PATENT DOCUMENTS

| | | | |
|---|---|---|---|
| 7,348,749 B2* | 3/2008 | Ide et al. ................. | 318/599 |
| 7,728,537 B2* | 6/2010 | Tomigashi ............ | 318/400.02 |
| 2009/0058334 A1* | 3/2009 | Yamamoto ............ | 318/400.02 |
| 2009/0237015 A1* | 9/2009 | Hashimoto et al. ... | 318/400.02 |
| 2010/0308757 A1* | 12/2010 | Ide et al. ............... | 318/400.02 |

FOREIGN PATENT DOCUMENTS

| | | |
|---|---|---|
| JP | 2001-251889 | 9/2001 |
| JP | 2005-110343 | 4/2005 |
| JP | 2006-87152 | 3/2006 |
| JP | 2008-220169 | 9/2008 |
| JP | 2011-10438 | 1/2011 |

* cited by examiner

Primary Examiner — Rina Duda
(74) Attorney, Agent, or Firm — Cozen O'Connor

(57) ABSTRACT

A phase voltage setting unit is configured to define an actual current phase region including a current phase error range based on parameters to which is added an individual difference of at least any one of a motor and an inverter. The phase voltage setting unit defines a stable operation current phase region in which a rotor position can be detected through sensorless control, and sets, as a target current, an electric current obtained by adding a phase difference corresponding to the number of revolutions detected by the revolution number detecting unit to an electric current set by current vector control, such that the actual current phase region is within the stable operation current phase region.

6 Claims, 8 Drawing Sheets

MOTOR CONTROL DEVICE

RELATED APPLICATIONS

This is a U.S. national stage of International application No. PCT/JP2012/052847 filed on Feb. 8, 2012.

This application claims the priority of Japanese application no. 2011-029813 filed Feb. 15, 2011, the entire content of which is hereby incorporated by reference.

TECHNICAL FIELD

The present invention relates to a motor control device, and more particularly, to a motor control device that variably controls the speed of a permanent magnetic synchronous motor through sensorless control.

BACKGROUND ART

As a motor having high efficiency and a wide variable speed range, a permanent magnetic synchronous motor (PMSM), in particular, an interior permanent magnetic synchronous motor (IPMSM) in which a permanent magnet is embedded in a rotor has found extensive applications such as a compressor driving motor of an air conditioner for vehicle and a drive motor for electric automobile. Demand for the motor is expected.

A motor control device that controls driving of the motor of this type is composed of a motor, an inverter, a direct-current power supply, and a controller incorporating a microcomputer.

In the operation of the motor, in general, the controller detects an electric current flowing through a coil wound around a stator (armature) of the motor and causes the electric current to follow a target current phase through current feedback control. In the current feedback control, the controller decomposes the target current phase into a d-axis current Id, which is a d-axis component parallel to a magnetic field, and a q-axis current Iq, which is a q-axis component orthogonal to the magnetic field, and sets, as the target current phase, a current vector composed from the d-axis current Id and the q-axis current Iq on a d-q-axis coordinate, and controls the current vector. Consequently, it is possible to highly efficiently operate the motor at optimum torque.

Specifically, there is known a current vector control method called maximum torque/current control, which includes setting, as a target current phase, a current phase in which generated torque of a motor is maximized with respect to a detected electric current. For example, Patent Literature 1 discloses the following general expression representing a relation between d and q-axis currents in performing the maximum torque/current control:

$$i_d = \frac{\Phi_a}{2(L_q - L_d)} - \sqrt{\frac{\Phi_a^2}{4(L_q - L_d)^2} + i_q^2} \quad \text{[Expression 1]}$$

In the expression, id: d-axis current, iq: q-axis current, Φa: permanent magnet magnetic flux, Lq: q-axis inductance, and Ld: d-axis inductance. In this case, the target current phase is set to maximize the generated torque of the motor with respect to the detected electric current without depending on the number of revolutions (angular velocity) ω of a rotor, i.e., the motor.

On the other hand, in the motor, it is a common practice to use so-called sensorless control, which includes detecting an induced voltage of the motor from, for example, information concerning an electric current and a voltage detected by a controller and effectively detecting a rotor position to control the motor without using a physical sensor. Actual d and q axes are not directly known during the sensorless control. Therefore, the controller sets imaginary axes respectively for the original d and q axes and executes the current vector control on the imaginary axes.

However, the imaginary axes are only axes assumed in the controller. Therefore, an angle error of Δθr is present between the actual d and q axes. In order to efficiently stably operate the motor, it is necessary to set a value of Δθr as small as possible.

For example, Patent Literature 2 discloses the following axial position estimation expression:

$$\Delta\theta \approx \tan^{-1}\left[\frac{V_{dc} - r \cdot I_{dc} + \omega_1 L_q \cdot I_{qc}}{V_{qc} - r \cdot I_{qc} - \omega_1 L_q \cdot I_{dc}}\right] \quad \text{[Expression 2]}$$

In the expression, Δθ: axial position estimation error (rotor position error, current phase error), Vdc: d-axis component of an applied voltage, Vqc: q-axis component of the applied voltage, Idc: d-axis current, Iqc: q-axis current, Lq: q-axis inductance, Ld: d-axis inductance, r: winding resistance of a coil, and ω1: frequency of the applied voltage. All of Vdc, Vqc, Idc, and Iqc described above are assumed values in the controller premised on the imaginary axes, all of Lq, Ld, and r described above are machine constants of the motor, and ω1 is a measured value. During the sensorless control, the controller performs control in order to converge Δθ described above to zero.

CITATION LIST

Patent Literature

Patent Literature 1: Japanese Patent Laid-Open No. 2008-220169

Patent Literature 2: Japanese Patent No. 3411878

SUMMARY OF INVENTION

Technical Problem

As explained above, all of Vdc, Vqc, Idc, and Iqc of the axial position error estimation expression of Expression 2 are the assumed values in the controller premised on the imaginary axes and are parameters including an error based on a mathematical model on an assumed d-q-axis coordinate and an individual difference of an inverter.

On the other hand, all of Φa of the d and q axis current relational expression of Expression 1 and Lq, Ld, and r of the axial position error estimation expression of Expression 2 are machine constants of the motor and are parameters including individual differences of respective motors to be manufactured. Therefore, during the sensorless control when the maximum torque/current control is performed, respective parameter errors based on the individual differences of the inverter and the motor substantially affect axial position estimation accuracy.

Specifically, a denominator term in the axial position error estimation expression may undesirably be zero or minus depending on the magnitudes of the respective parameter errors. In this case, an axial position cannot be estimated and a rotor position cannot be estimated either. Therefore, the motor may be operated while deviating from a stable operation limit for enabling the motor to be stably operated in the sensorless control and step-out may occur.

As explained above, the maximum torque/current control is performed without depending on the number of revolutions of the motor. Therefore, even when the motor is operated in a low revolution number range in which the number of revolutions of the motor is equal to or smaller than rated speed, the motor is operated in a current phase in which the torque of the motor is maximum. However, in the axial position error estimation expression, ω1 is present in both of the numerator term and the denominator term thereof. Therefore, in particular, the influence of the respective parameter errors on Δθ is relatively large when the number of revolutions of the motor is small. The axial position estimation accuracy during the sensorless control is markedly deteriorated. That is, when the respective parameter errors are relatively large and the motor is operated in the row revolution number range, the motor is operated while deviating from the stable operation limit during the sensorless control and the risk of occurrence of step-out further increases.

In FIG. 9, a target current phase line L1, actual current phase lines L2 and L3, a stable operation limit current phase line L4, an actual current phase region A1, and a stable operation current phase region A2 in the case in which the number of revolutions ω of the motor is in a low revolution number range ω1 (e.g., 500 rpm) when the motor is traditionally operated in the maximum torque/current control are respectively shown on the d-q-axis coordinate.

The target current phase line L1 is a locus of a current vector formed by plotting a target current, which becomes an ideal current phase when a machine has no error during the motor operation, on the d-q-axis coordinate and indicating the target current with a solid line. The stable operation limit current phase line L4 is a locus of a current vector formed by plotting a stable limit current phase, in which the denominator term of Expression 2 becomes zero and a motor 1 cannot be stably operated when this limit is exceeded, on the d-q-axis coordinate and indicating the stable limit current phase with a solid line.

The actual current phase lines L2 and L3 are imaginary lines defined taking into account the fact that Vdc, Vqc, Idc, and Iqc of the axial position error estimation expression of Expression 2 are parameters including an individual difference of an inverter 2 and Φa of the d and q-axis current relational expression of Expression 1 and Lq, Ld, and r of the axial position error estimation expression of Expression 2 are machine constants of the motor 1 and are parameters including an individual difference of the motor. The actual current phase lines L2 and L3 are focuses of current vectors formed by plotting actual current phases, which take into account the parameter errors of the motor and the inverter, on the d-q-axis coordinate and indicating the actual current phases with dashed lines.

The actual current phase region A1 is a region defined as a range including a current phase error between the two actual current phase lines L2 and L3. The stable operation current phase region A2 is a region defined as a range in which a rotor position can be detected in the sensorless control and the stable operation limit for enabling the motor to be stably operated is not exceeded.

As it is evident from FIG. 9, when the respective parameter errors are particularly large in performing the maximum torque/current control, the motor may be operated in a hatched region in FIG. 9 where a part of the actual current phase region A1 exceeds the stable operation current phase region A2. In this case, the sensorless control of the motor is disabled and step-out occurs. Occurrence of such a sensorless uncontrollable state is conspicuous when the motor is operated in the low revolution number range and the respective parameter errors are particularly large. In the respective related arts, no special consideration has been given in this regard. A problem still remains concerning improvement of stability of the sensorless control of the permanent magnetic synchronous motor.

The present invention has been devised in view of such problems and it is an object of the present invention to provide a motor control device that can improve stability of the sensorless control of the permanent magnetic synchronous motor.

SUMMARY

In order to attain an object, a motor control device according to the present invention is a motor control device that detects a rotor position of a permanent magnetic synchronous motor through sensorless control, the motor control device including: current detecting means for detecting, via an inverter, an electric current flowing through a coil of the motor; applied voltage detecting means for detecting, via the inverter, a voltage applied to the coil of the motor; rotor position detecting means for detecting the rotor position on the basis of the electric current detected by the current detecting means and the voltage detected by the applied voltage detecting means; revolution number detecting means for detecting the number of revolutions of the motor on the basis of the rotor position detected by the rotor position detecting means; and phase voltage setting means for setting a target current in current vector control based on the rotor position detected by the rotor position detecting means and setting a target voltage on the basis of the target current and the number of revolutions detected by the revolution number detecting means. The phase voltage setting means defines an actual current phase region including a current phase error range based on parameters including an individual difference of at least any one of the motor and the inverter, defines a stable operation current phase region in which the rotor position can be detected through sensorless control, and sets, as the target current, an electric current obtained by adding a predetermined phase difference corresponding to the number of revolutions detected by the revolution number detecting means to an electric current set by the current vector control based on the current phase detected by the rotor position detecting means such that the actual current phase region is within the stable operation current phase region.

More specifically, the phase voltage setting means includes a data table for enabling the target current to be selected using the number of revolutions detected by the revolution number detecting means as a parameter.

The data table used in the phase voltage setting means includes a first table applied when the number of revolutions detected by the revolution number detecting means is equal to or smaller than a predetermined low revolution number range and a second table applied when the number of revolutions detected by the revolution number detecting means is equal to or larger than a predetermined steady revolution number range.

Further, the phase voltage setting means calculates and sets the target current according to interpolation processing based on respective data of the first and second tables when the number of revolutions detected by the revolution number detecting means is smaller than the predetermined low revolution number range and smaller than the predetermined steady revolution number range.

Specifically, the parameters including the individual difference of at least any one of the motor and the inverter include at least any one of the electric current detected by the current detecting means, the voltage detected by the applied voltage detecting means, a permanent magnet magnetic flux of the motor, inductance, and winding resistance of the coil.

The current vector control is maximum torque/current control, which includes setting, as the target current, an electric current with which generated torque of the motor is maximized with respect to the electric current detected by the current detecting means.

DETAILED DESCRIPTION

According to one embodiment, the phase voltage setting means defines the actual current phase region and the stable operation current phase region and sets, as the target current, the electric current obtained by adding the predetermined phase difference corresponding to the number of revolutions detected by the revolution number detecting means to the electric current set by the current vector control such that the actual current phase region is within the stable operation current phase region. Consequently, it is possible to set the target current according to the number of revolutions of the motor, surely avoid a sensorless uncontrollable state involved in a motor revolution number change, and surely improve stability of the sensorless control of the permanent magnetic synchronous motor.

According to one embodiment, the phase voltage setting means includes the data table for enabling the target current to be selected using the number of revolutions detected by the revolution number detecting means as the parameter. Consequently, it is possible to suitably detect the target current with a low processing load in the motor control device.

According to one embodiment, the data table used in the phase voltage setting means is configured from the first table and the second table corresponding to the number of revolutions of the motor. Consequently, it is possible to generate, according to the number of revolutions of the motor, the data table to be divided into a region where an electric current obtained by adding the phase difference to the electric current set by the current vector control is set as the target current and a region where the target current set by the current vector control is directly set as a final target current with the phase difference set to zero. It is possible to suitably reduce generation costs for the data table by correcting data only in a necessary region.

According to one embodiment, the phase voltage setting means calculates and sets the target current according to interpolation processing based on respective data of the first and second tables. Consequently, it is possible to suitably accurately detect the target current even when the number of revolutions of the motor is present in a region between the two data tables.

According to one embodiment, specifically, the parameters including the individual difference of at least any one of the motor and the inverter include at least any one of the electric current detected by the current detecting means, the voltage detected by the applied voltage detecting means, a permanent magnet magnetic flux of the motor, inductance, and winding resistance of and the coil. These parameters are main error factors in controlling the inverter. Therefore, if this error is taken into account, control stability of the motor is improved.

According to one embodiment, the current vector control is the maximum torque/current control, which includes setting, as the target current, an electric current with which generated torque of the motor is maximized with respect to the electric current detected by the current detecting means. Consequently, it is possible to operate the motor at high efficiency while avoiding a sensorless uncontrollable state involved in a motor revolution number change and improving stability of the sensorless control of the motor.

DESCRIPTION OF EMBODIMENTS

Figure 1:
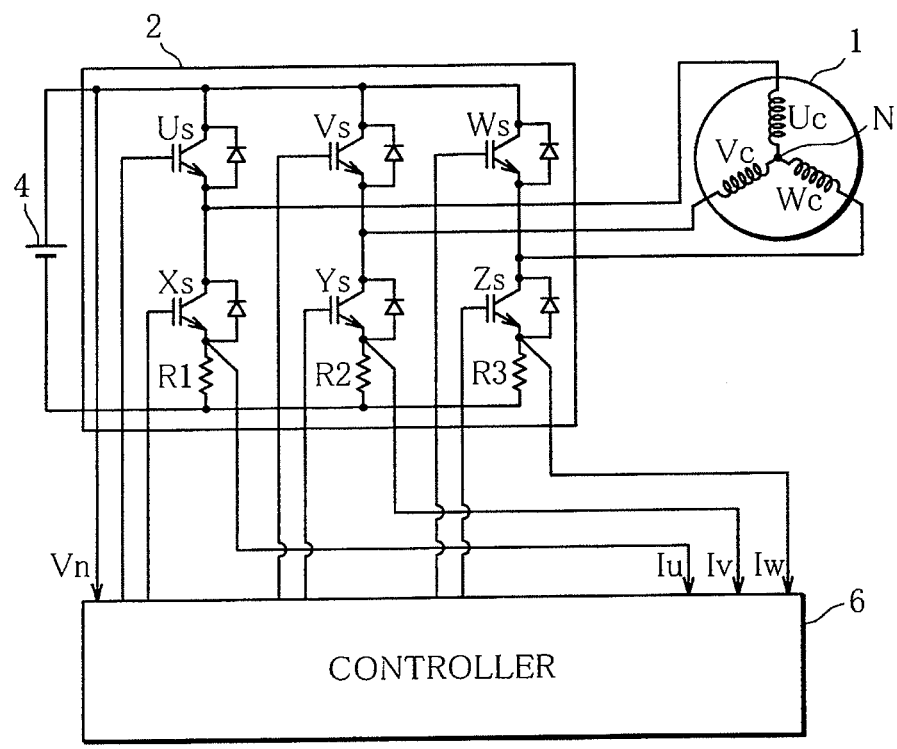
FIG. 1 is a configuration diagram of a motor control device according to a first embodiment of the present invention.

FIG. 1 is a configuration diagram of a motor control device according to a first embodiment of the present invention. The motor control device is configured from a motor 1, an inverter 2, a direct-current power supply 4, and a controller 6 incorporating a microcomputer.

Figure 2:
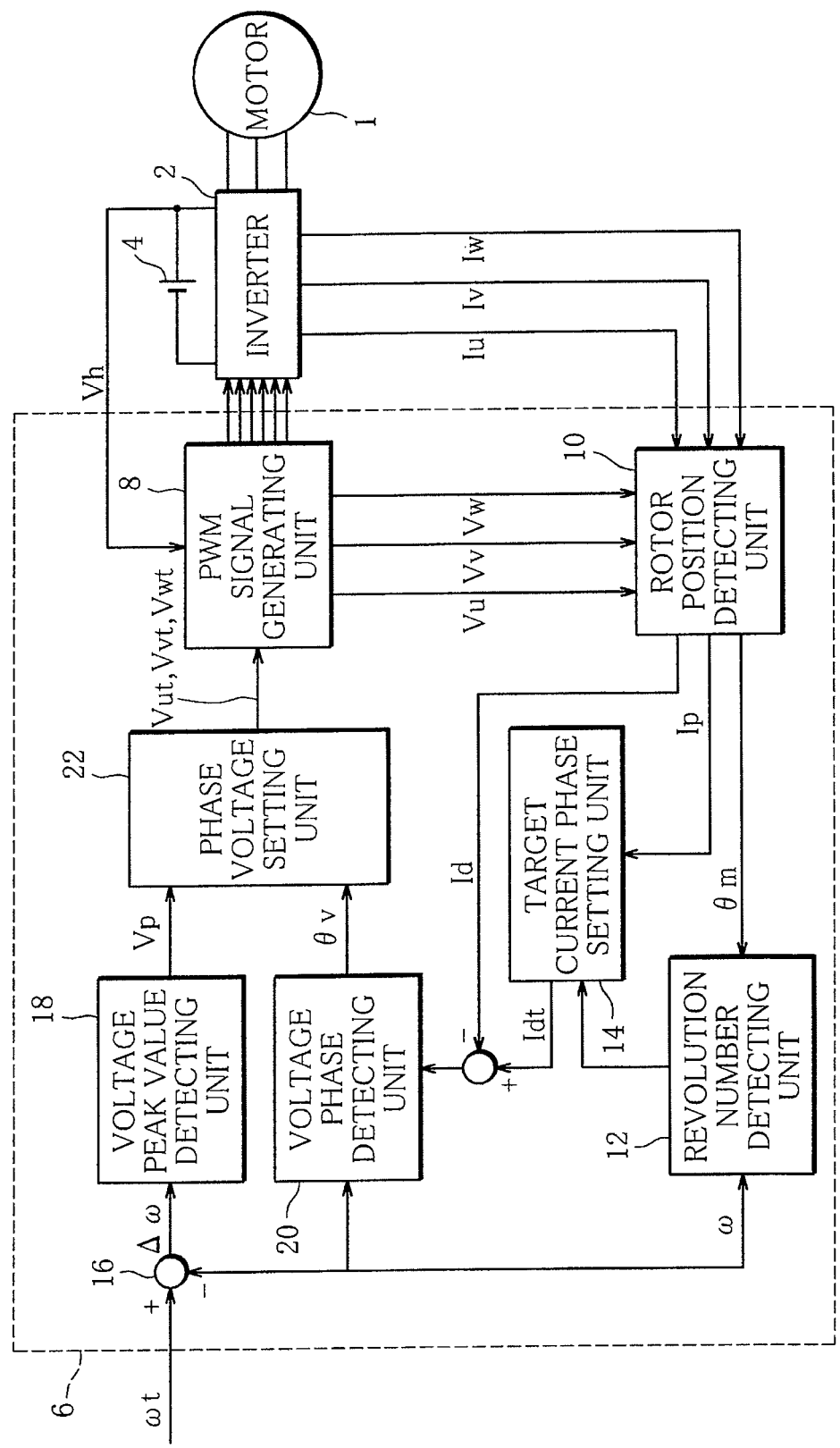
FIG. 2 is a control block diagram showing sensorless control for a rotor position of a motor performed by a controller shown in FIG. 1.

FIG. 2 is a control block diagram showing sensorless control of the motor 1 performed by the controller 6. The controller 6 includes a PWM signal generating unit 8, a rotor position detecting unit (rotor position detecting means) 10, a revolution number detecting unit (revolution number detecting means) 12, a target current phase setting unit 14, an adder 16, a voltage peak value detecting unit 18, a voltage phase detecting unit 20, and a phase voltage setting unit (phase voltage setting means) 22.

The motor 1 is a three-phase blushless DC motor. The motor 1 includes a not-shown stator including coils of three phases (a U-phase coil Uc, a V-phase coil Vc, and a W-phase coil Wc) and a not-shown rotor including a permanent magnet. The U-phase coil Uc, the V-phase coil Vc, and the W-phase coil Wc are connected in a star shape centering on a neutral point N as shown in FIG. 1 or connected in a delta shape.

The inverter 2 is a three-phase bipolar driving type inverter. The inverter 2 includes switching elements of three phases corresponding to the coils of the three phases of the motor 1, specifically, six switching elements (upper-phase switching elements Us, Vs, and Ws and lower-phase switching elements Xs, Ys, and Zs) consisting of IGBT or the like and shunt resistors R1, R2, and R3.

The upper-phase switching element Us, the lower-phase switching element Xs, the shunt resistor R1, the upper-phase switching element Vs, the lower-phase switching element Ys, the shunt resistor R2, the upper-phase switching element Ws, the lower-phase switching element Zs, and the shunt resistor R3 are connected in series to one another. Output terminals of the direct-current power supply 4, which generates a high voltage Vh, are connected in parallel to both ends of respective series connection lines for these devices.

An emitter side of the upper-phase switching element Us is connected to the U-phase coil Uc of the motor 1. An emitter side of the upper-phase switching element Vs is connected to the V-phase coil Vc of the motor 1. An emitter side of the upper-phase switching element Ws is connected to the V-phase coil Wc of the motor 1.

Further, gates of the upper-phase switching elements Us, Vs, and Ws, gates of the lower-phase switching elements Xs, Ys, and Zs, and a secondary side output terminal of the direct-current power supply 4 are respectively connected to the PWM signal generating unit 8. Further, the lower-phase switching element Xs side of the shunt resistor R1, the lower-phase switching element Ys side of the shunt resistor R2, and the lower-phase switching element Zs side of the shunt resistor R3 are respectively connected to the rotor position detecting unit 10.

The inverter 2 detects, using voltages respectively detected by the shunt resistors R1, R2, and R3, electric currents (a U-phase current Iu, a V-phase current Iv, and a W-phase current Iw) flowing through the U-phase coil Uc, the V-phase coil Vc, and the W-phase coil Wc of the motor 1 (current detecting means) and sends the electric currents to the rotor position detecting unit 10.

The PWM signal generating unit 8 detects a high voltage Vh of the direct-current power supply 4, generates, on the basis of the high voltage Vh and a phase voltage set by the phase-voltage setting unit 22, a PWM signal for turning on and off the respective switching elements in the gates of the upper-phase switching elements Us, Vs, and Ws and the gates of the lower-phase switching elements Xs, Ys, and Zs of the inverter 2, and sends the PWM signal to the inverter 2.

The upper-phase switching elements Us, Vs, and Ws and the lower-phase switching elements Xs, Ys, and Zs of the inverter 2 are turned on and off in a predetermined pattern according to the PWM signal from the PWM signal generating unit 8 and apply sine wave energization (180 degree energization) based on this ON/OFF pattern to the U-phase coil Uc, the V-phase coil Vc, and the W-phase coil Wc of the motor 1.

The PWM signal generating unit 8 is connected to the rotor position detecting unit 10. The PWM signal generating unit 8 detects, using the high voltage Vh of the direct-current power supply 4 detected by the PWM signal generating unit 8, voltages (a U-phase applied voltage Vu, a V-phase applied voltage Vv, and a W-phase applied voltage Vw) applied to the U-phase coil Uc, the V-phase coil Vc, and the W-phase coil Wc of the motor 1 (applied voltage detecting means) and sends the voltages to the rotor position detecting unit 10.

The rotor position detecting unit 10 detects, using the U-phase current Iu, the V-phase current Iv, and the W-phase current Iw sent from the inverter 2 and the U-phase applied voltage Vu, the V-phase applied voltage Vv, and the W-phase applied voltage Vw sent from the PWM signal generating unit 8, an induced voltage peak value Ep (an induced voltage phase), an induced voltage electric angle $\theta e$ (an induced voltage phase), a phase current peak value Ip (a current phase), and a phase current electric angle $\theta i$ (a current phase).

Figure 3:
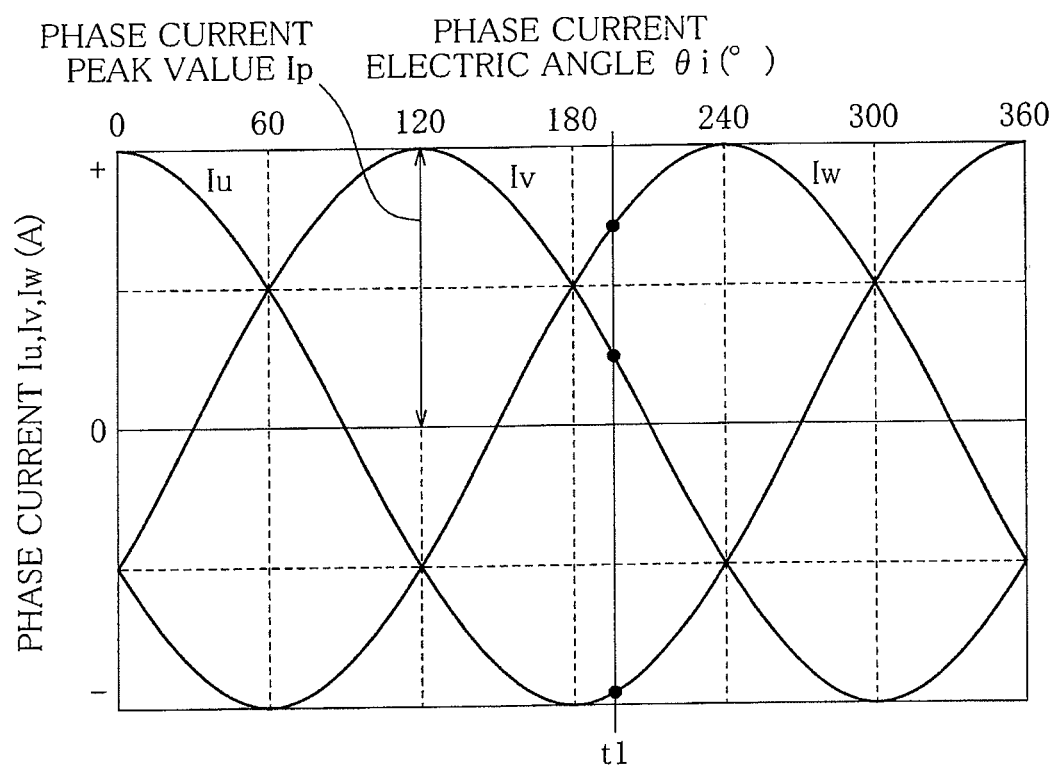
FIG. 3 is a phase current waveform chart at the time when sine wave energization (180° energization) is applied to a U-phase coil Uc, a V-phase coil Vc, and a W-phase coil We of the motor shown in FIG. 2.

Specifically, referring to a phase current waveform chart of FIG. 3 at the time when sine wave energization (180° energization) is applied to the U-phase coil Uc, the V-phase coil Vc, and the W-phase coil Wc of the motor 1, the U-phase current Iu, the V-phase current Iv, and the W-phase current Iw forming a sine waveform respectively have a phase difference of 120°.

From the phase current waveform chart, the following expressions hold between the U-phase current Iu, the V-phase current Iv, and the W-phase current Iw and the phase current peak value Ip and the phase current electric angle $\theta i$:

$$Iu = Ip \times \cos(\theta i)$$

$$Iv = Ip \times \cos(\theta i - 2/3\pi)$$

$$Iw = Ip \times \cos(\theta i + 2/3\pi)$$

The detection of the phase current peak value Ip and the phase current electric angle $\theta i$ in the rotor position detecting unit 10 is performed on the premise that the expressions hold. The phase current peak value Ip and the phase current electric angle $\theta i$ are calculated by a calculation of the expressions using the U-phase current Iu, the V-phase current Iv, and the W-phase current Iw sent from the inverter 2.

Figure 4:
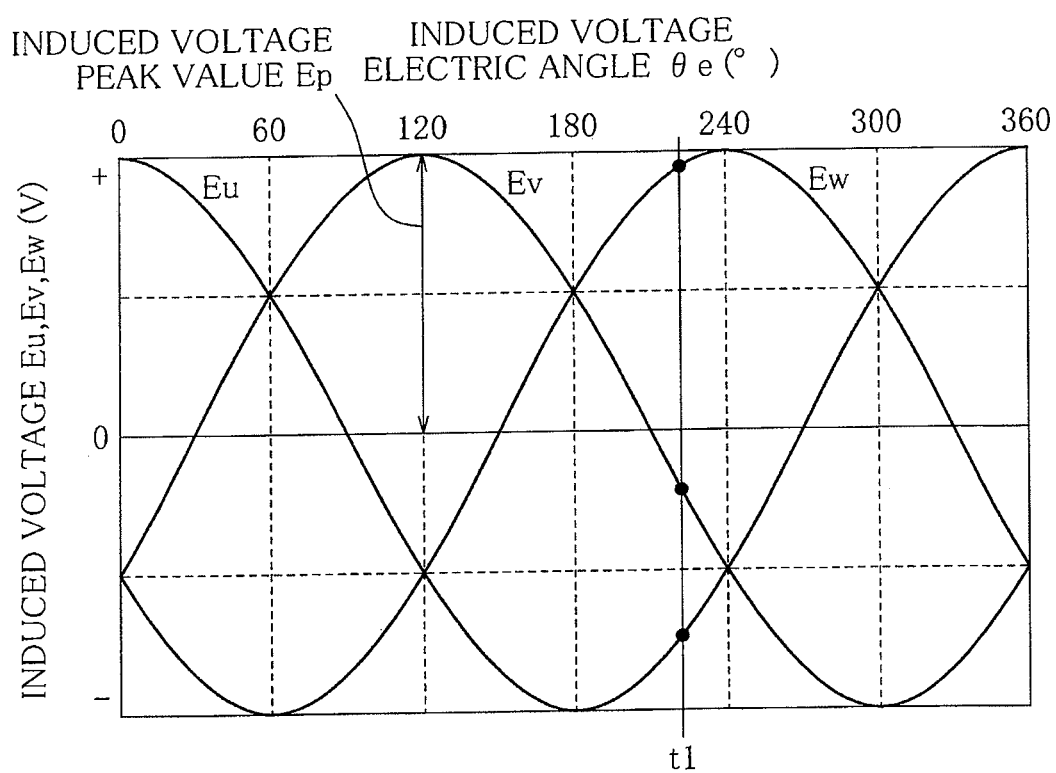
FIG. 4 is an induced voltage waveform chart at the time when the sine wave energization (180° energization) is applied to the U-phase coil Uc, the V-phase coil Vc, and the W-phase coil We of the motor shown in FIG. 2.

On the other hand, referring to the induced voltage waveform chart of FIG. 4 at the time when sine wave energization (180° energization) is applied to the U-phase coil Uc, the V-phase coil Vc, and the W-phase coil Wc of the motor 1, a U-phase induced voltage Eu, a V-phase induced voltage Ev, a the W-phase induced voltage Ew forming a sine waveform respectively have a phase difference of 120°.

From the induced voltage waveform chart, the following expressions hold between the U-phase induced voltage Eu, the V-phase induced voltage Ev, and the W-phase induced voltage Ew and the induced voltage peak value Ep and the induced voltage electric angle $\theta e$:

$$Eu = Ep \times \cos(\theta e)$$

$$Ev = Ep \times \cos(\theta e - 2/3\pi)$$

$$Ew = Ep \times \cos(\theta e + 2/3\pi)$$

The following expressions hold among the U-phase applied voltage Vu, the V-phase applied voltage Vv, and the W-phase applied voltage Vw, the U-phase current Iu, the V-phase current Iv, and the W-phase current Iw, U-phase coil resistance Ru, V-phase coil resistance Rv, and W-phase coil resistance Rw, and the U-phase induced voltage Eu, the V-phase induced voltage Ev, and the W-phase induced voltage Ew:

$$Vu - Iu \times Ru = Eu$$

$$Vv - Iv \times Rv = Ev$$

$$Vw - Iw \times Rw = Ew$$

The detection of the induced voltage peak value Ep and the induced voltage electric angle $\theta e$ in the rotor position detecting unit 10 is performed on the premise that the expressions hold. The U-phase induced voltage Eu, the V-phase induced voltage Ev, and the W-phase induced voltage Ew are calculated from the expression (the latter expression) using the U-phase current Iu, the V-phase current Iv, and the W-phase current Iw sent from the inverter 2 and the U-phase applied voltage Vu, the V-phase applied voltage Vv, and the W-phase applied voltage Vw sent from the PWM signal generating unit 8. The induced voltage peak value Ep and the induced voltage electric angle θe are calculated from the expression (the former expression) using the calculated U-phase induced voltage Eu, V-phase induced voltage Ev, and W-phase induced voltage Ew.

The rotor position detecting unit 10 detects a rotor position θm from the following expression using the phase current electric angle θi detected here and a current phase β selected from a data table explained below prepared in advance:

$$\theta m = \theta i - \beta - 90°$$

Sensorless control not by a physical sensor is performed in the rotor position detecting unit 10. Note that, as explained above, an angle error Δθ of an axial position calculated from the axial position error estimation expression of Expression 2 is present in the rotor position θm detected by the sensorless control.

The data table used here defines the current phase β using [phase current peak value Ip] and [induced voltage electric angle θe–phase current electric angle θi] as parameters. The expected current phase β can be selected using [phase current peak value Ip] and [induced voltage electric angle θe–phase current electric angle θi] as parameters. Note that the phase current peak value Ip detected by the rotor position detecting unit 10 corresponds to [phase current peak value Ip]. A value obtained by subtracting the phase current electric angle θi from the induced voltage electric angle θe detected by the rotor position detecting unit 10 corresponds to [induced voltage electric angle θe–phase current electric angle θi].

Figure 5:
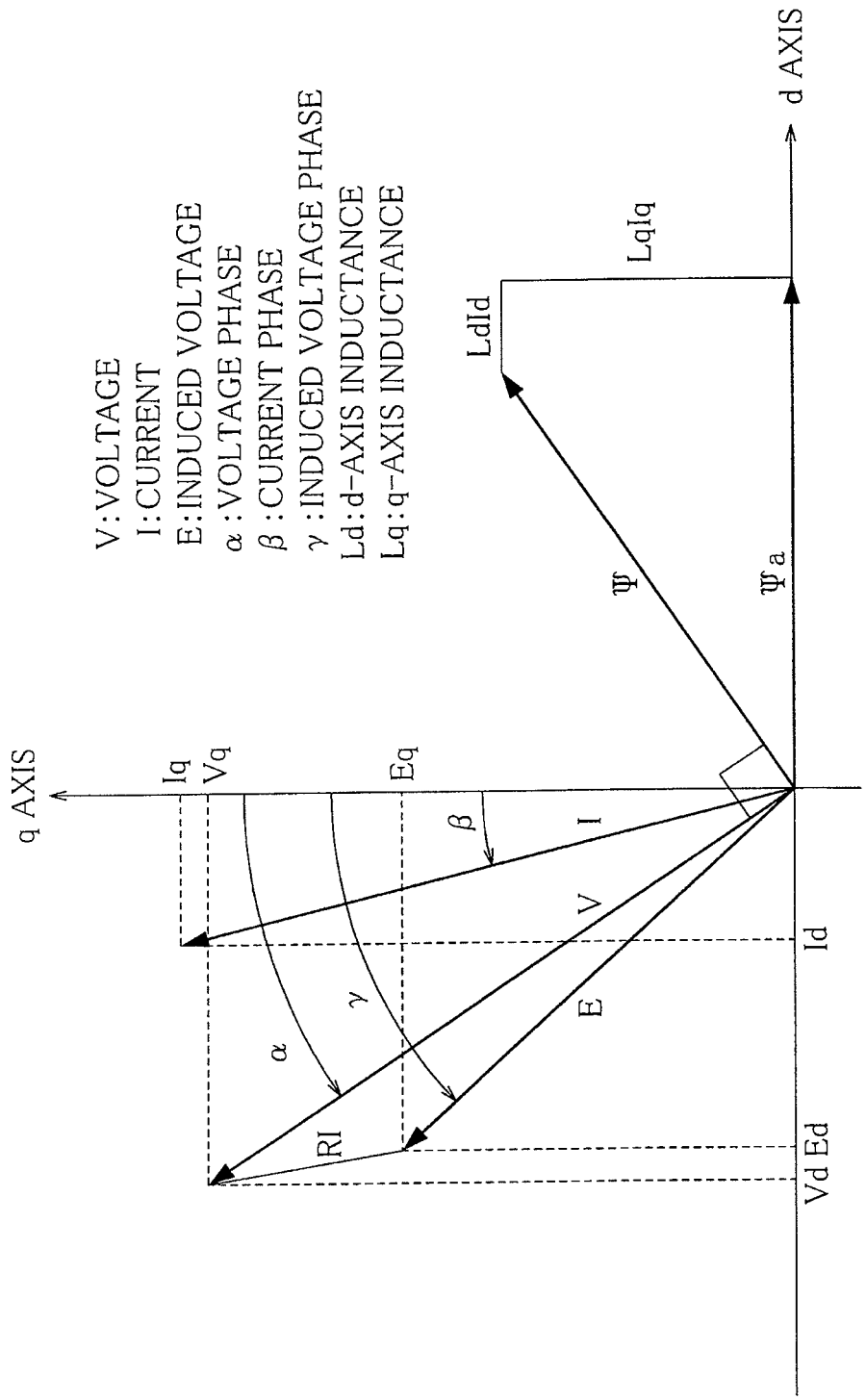
FIG. 5 is a motor vector diagram at the time when a rotor of the motor shown in FIG. 2 is rotating.

FIG. 5 is a motor vector diagram at the time when the rotor of the motor 1 is rotating. A relation among a voltage V, an electric current I, and an induced voltage E (=ωψ) is represented as vectors on the d-q-axis coordinate. In the figure, Vd represents a d-axis component of the voltage V, Vq represents a q-axis component of the voltage V, Id represents a d-axis component (a d-axis current) of the electric current I, Iq represents a q-axis component (a q-axis current) of the electric current I, Ed represents a d-axis component of the induced voltage E, Eq represents a q-axis component of the induced voltage E, α represents a voltage phase based on the q axis, β represents a current phase based on the q axis, and γ represents an induced voltage phase based on the q axis. In the figure, ψa represents a magnetic flux of a permanent magnet of the rotor, Ld represents d-axis inductance, Lq represents q-axis inductance, R represents winding resistance of the stator, and ψ represents a total flux linkage of the rotor.

From the motor vector diagram, when the number of revolutions of the rotor is represented as ω, the following expression holds:

$$\begin{pmatrix} Vd \\ Vq \end{pmatrix} = \begin{pmatrix} R & -\omega Lq \\ \omega Ld & R \end{pmatrix} \begin{pmatrix} Id \\ Iq \end{pmatrix} + \begin{pmatrix} 0 \\ \omega \Psi a \end{pmatrix} \quad \text{[Expression 3]}$$

When a value concerning w is transferred from the right side to the left side of the expression, the following expression holds:

$$\begin{pmatrix} Ed/\omega = (Vd - Id \times R)/\omega \\ Eq/\omega = (Vq - Iq \times R)/\omega \end{pmatrix} = \begin{pmatrix} 0 & -Lq \\ Ld & 0 \end{pmatrix} \begin{pmatrix} Id \\ Iq \end{pmatrix} + \begin{pmatrix} 0 \\ \Psi a \end{pmatrix} \quad \text{[Expression 4]}$$

The generation of the data table used in detecting the rotor position θm in the rotor position detecting unit 10 is performed on the premise that the expressions hold under the motor vector diagram. The current phase β at the time when [induced voltage phase γ–current phase β] is a predetermined value is stored while the current phase β and the electric current I shown in the motor vector diagram are respectively increased stepwise in predetermined ranges. The data table of the current phase β including [phase current peak value Ip] equivalent to [electric current I] and [induced voltage electric angle θe–phase current electric angle θi] equivalent to [induced voltage phase γ–current phase β] as parameters is generated. The rotor position θm detected by the rotor position detecting unit 10 using the generated data table is sent to the revolution number detecting unit 12. The phase current peak value Ip detected by the rotor position detecting unit 10 using the data table is sent to the target current phase setting unit 14.

The revolution number detecting unit 12 calculates a rotor position change amount Δθm using the rotor position θm, which is detected by the rotor position detecting unit 10, by subtracting a rotor position θm–1, a calculation cycle of which is one cycle before a calculation cycle of the rotor position θm, from the rotor position θm. The revolution number detecting unit 12 applies a predetermined filter to a value obtained by time-differentiating the rotor position change amount Δθm to detect the number of revolutions ω of the motor 1 and sends the number of revolutions ω to the adder 16 and the target current phase setting unit 14. The revolution number detecting unit 12 feeds back the number of revolutions ω calculated by the revolution number detecting unit 12 to a target number of revolutions ωt of the motor 1, which is instructed to the controller 6, through the adder 16, calculates a revolution number difference Δω according to processing such as P control or PI control, and sends the revolution number difference Δω to the voltage peak value detecting unit 18.

The voltage peak value detecting unit 18 detects an applied voltage peak value Vp (a target voltage) of a voltage applied to the motor 1 using the calculated revolution number difference Δω according to the processing such as the P control or the PI control and sends the applied voltage peak value Vp to the phase voltage setting unit 22.

The target current phase setting unit 14 sets a target current according to the relational expression of the d and q axis currents indicated by Expression 1 such that generated torque of the motor 1 with respect to a phase current is maximized by the maximum torque/current control. Specifically, the target current phase setting unit 14 sets a target d-axis current Idt using the phase current peak value Ip detected by the rotor position detecting unit 10, the number of revolutions ω detected by the revolution number detecting unit 12, and a data table explained below prepared in advance and sends the target d-axis current Idt to the voltage phase detecting unit 20.

The data table used here defines the target d-axis current Idt as a target current using [phase current peak value Ip] as a parameter. The expected target d-axis current Idt can be selected using [phase current peak value Ip] as the parameter.

Note that the phase current peak value Ip detected by the rotor position detecting unit 10 corresponds to [phase current peak value Ip].

The generation of the data table used in setting the target d-axis current Idt in the target current phase setting unit 14 is performed on the premise that the expression under the motor vector diagram holds and the Expression 1 further holds under the maximum torque/current control in principle. A locus of a current vector including the current phase β and the electric current I is stored while the current phase β and the electric current I shown in the motor vector diagram are respectively increased stepwise in predetermined ranges. The data table of the target d-axis current Idt including [phase current peak value Ip] equivalent to [electric current I] and [number of revolutions ω] as parameters is generated.

Specifically, the target d-axis current Idt is calculated by the following expression in which the phase current peak value Ip, the number of revolutions ω, and the coefficient a are set as parameters:

$$Idt = a \times f(Ip, \omega)$$

A data table including a result of the calculation as data is prepared in advance in the target current phase setting unit 14.

The target d-axis current Idt set by the target current phase setting unit 14 using the generated data table is sent to the voltage phase detecting unit 20 as a target value for an actual d-axis current detected by the rotor position detecting unit 10. Feedback control of the d-axis current is performed.

The voltage phase detecting unit 20 detects an applied voltage phase θv (a target voltage phase) of a voltage applied to the motor 1 using the target d-axis current Idt set by the target current phase setting unit 14 and sends the applied voltage phase θv to the phase voltage setting unit 22.

The phase voltage setting unit 22 sets, using the applied voltage peak value Vp detected by the voltage peak value detecting unit 18 and the applied voltage phase θv detected by the voltage phase detecting unit 20, applied setting voltages (a U-phase applied setting voltage Vut, a V-phase applied setting voltage Vvt, and a W-phase applied setting voltage Vwt) to be applied to the U-phase coil Uc, the V-phase coil Vc, and the W-phase coil Wc of the motor 1 and sends the applied setting voltages to the PWM signal generating unit 8.

The PWM signal generating unit 8 applies, via the inverter 2, on the basis of an ON/OFF pattern of a PWM signal, sine wave energization (180 degree energization) to the U-phase coil Uc, the V-phase coil Vc, and the W-phase coil Wc of the motor 1 with the applied setting voltages set by the phase voltage setting unit 22. Consequently, the motor 1 is operated at a desired number of revolutions.

A method of generating the data table prepared in advance in the target current phase setting unit 14 is explained more in detail below with reference to FIGS. 6 to 8.

Figure 6:
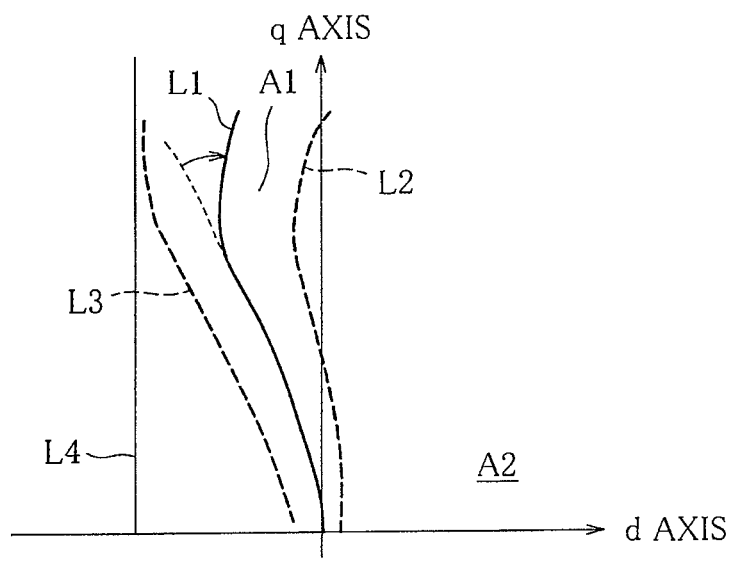
FIG. 6 is a diagram in which a target current phase line L1, actual current phase lines L2 and L3, a stable operation limit current phase line L4, an actual current phase region A1, and a stable operation current phase region A2 at the time when the motor is operated in a low revolution number range ω1 are shown on a d-q-axis coordinate.
Figure 7:
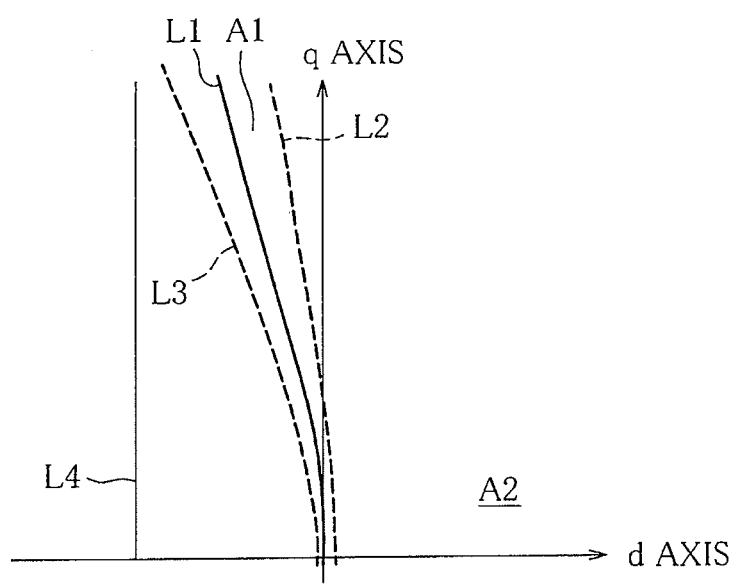
FIG. 7 is a diagram in which the target current phase line L1, the actual current phase lines L2 and L3, the stable operation limit current phase line L4, the actual current phase region A1, and the stable operation current phase region A2 at the time when the motor is operated in a steady revolution number range con are shown on the d-q-axis coordinate.

In FIGS. 6 and 7, the target current phase line L1, the actual current phase lines L2 and L3, the stable operation limit current phase line L4, the actual current phase region A1, and the stable operation current phase region A2 are respectively shown on the d-q-axis coordinate.

The target current phase line L1 is a locus of a current vector formed by plotting a target current phase, which is based on the target d-axis current Idt obtained by the expression described above, on the d-q-axis coordinate and indicating the target current phase with a solid line. The stable operation limit current phase line L4 is a locus of a current vector formed by plotting a stable limit current phase, which is a limit value for enabling a rotor position to be estimated by the sensorless control and for enabling the motor 1 to be stably operated, on the d-q-axis coordinate and indicating the stable limit current phase with a solid line.

The actual current phase lines L2 and L3 are imaginary lines defined taking into account the fact that Vdc, Vqc, Idc, and Iqc of the axial position error estimation expression shown in Expression 2 are parameters including an individual difference of an inverter 2 and Φa of the d and q-axis current relational expression shown in Expression 1 and Lq, Ld, and r of the axial position error estimation expression are machine constants of the motor 1 and are parameters including an individual difference of the motor 1. The actual current phase lines L2 and L3 are focuses of current vectors formed by plotting actual current phases, which take into account the parameter errors of the motor 1 and the inverter 2, on the d-q-axis coordinate and indicating the actual current phases with dashed lines.

The actual current phase region A1 is a region defined as a range including a current phase error between the two actual current phase lines L2 and L3. The stable operation current phase region A2 is a region defined further on the right side than the stable operation limit current phase line L4 as a range in which a rotor position can be detected in the sensorless control and the stable operation limit for enabling the motor to be stably operated is not exceeded.

Figure 9:
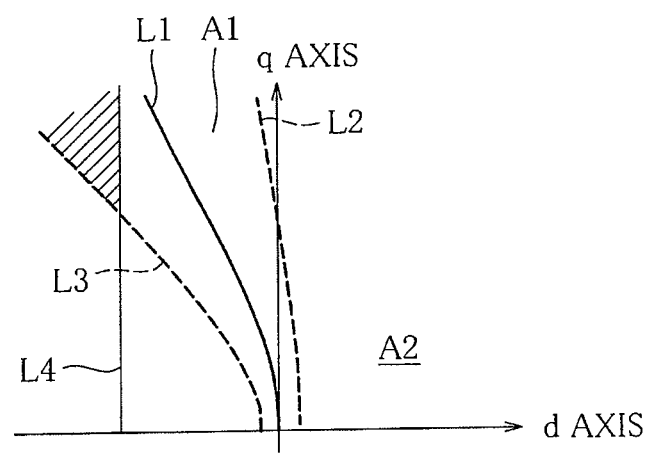
FIG. 9 is a diagram in which the target current phase line L1, the actual current phase lines L2 and L3, the stable operation limit current phase line L4, the actual current phase region A1, and the stable operation current phase region A2 at the time when the motor is operated in the low revolution number range ω1 in the past are shown on the d-q-axis coordinate.

FIG. 6 shows the target current phase line L1, the actual current phase lines L2 and L3, the stable operation limit current phase line L4, the actual current phase region A1, and the stable operation current phase region A2 formed when the motor 1 is operated in the low revolution number range ωl in which the number of revolutions ω is, for example, 500 rpm. In this case, as already explained using FIG. 9, the influence of the individual differences of the motor 1 and the inverter 2 with respect to the axial position estimation error Δθ, i.e., the rotor position change amount Δθ is relatively large, a current phase error range on the d-q-axis coordinate is widened, and the actual current phase region A1 is also widened. Therefore, in a region in which the number of revolutions ω of the data table of the target d-axis current Idt satisfies a relational expression ω≤ωl, data obtained by adding a phase difference for reducing a d-axis current according to an increase in a q-axis current to data of the data table of the target d-axis current Idt in performing normal maximum torque/current control is stored. The target current phase line L1 is also deformed in an arrow direction shown in FIG. 6.

On the other hand, FIG. 7 shows the target current phase line L1, the actual current phase lines L2 and L3, the stable operation limit current phase line L4, the actual current phase region A1, and the stable operation current phase region A2 formed when the motor 1 is operated in the steady revolution number range ωn in which the number of revolutions ω is, for example, 2500 rpm. In this case, the number of revolutions ω is large compared with the case shown in FIG. 6 and the influence of the individual differences of the motor and the inverter on the rotor position change amount Δθ is relatively small. Therefore, the current phase error range on the d-q-axis coordinate is narrow compared with the case shown in FIG. 6 and the actual current phase region A1 is also narrow. Therefore, even if the data of the data table of the target d-axis current Idt in performing the normal maximum torque/current control is directly used, the actual current phase region A1 does not deviate from the stable operation current phase region A2. Therefore, in the region in which the number of revolutions ω of the data table of the target d-axis current Idt satisfies a relational expression ωn≤ω, the data in normally performing the maximum torque/current control is directly stored with a phase difference added thereto set to zero.

Further, in a region in which the number of revolutions ω of the data table of the target d-axis current Idt satisfies a relational expression ωl<ω<ωn, data for enabling the optimum target d-axis current Idt based on the maximum torque/current control and an optimum target current phase to be selected is set in advance.

As explained above, in this embodiment, the target current phase setting unit 14 can set the target d-axis current Idt, i.e., a target current phase corresponding to the number of revolutions of the motor 1. Therefore, it is possible to avoid a sensorless uncontrollable state involved in a revolution number change of the motor 1 and improve stability of the sensorless control of the motor 1.

Specifically, the target current phase setting unit 14 defines the actual current phase region A1 and the stable operation current phase region A2 and sets a target current phase such that the actual current phase region A1 is within the stable operation current phase region A2. Therefore, even when the motor is operated in a low revolution range and it is predicted that the machine constant of the motor fluctuates and the motor cannot be operated in the target current phase within the stable operation current phase region A2, it is possible to surely avoid a sensorless uncontrollable state involved in a revolution number change of the motor 1 and surely improve stability of the sensorless control of the motor 1.

The target current phase setting unit 14 includes the data table for enabling the target current phase to be selected using [phase current peak value Ip], which is the current phase, detected by the rotor position detecting unit 10 and [the number of revolutions $\omega$] detected by the revolution number detecting unit 12 as parameters. Consequently, it is possible to suitably detect the target current phase with a low processing load in the motor control device.

Further, the current vector control of the maximum torque/current control is performed in principle. Consequently, it is possible to operate the motor 1 at high efficiency while avoiding a sensorless uncontrollable state involved in a revolution number change of the motor 1 and improving stability of the sensorless control of the motor 1.

Next, a method of setting the target d-axis current Idt according to the second embodiment of the present invention is explained with reference to a flowchart of FIG. 8. Note that a basic configuration of a motor control device and a basic control method for the motor 1 are the same as those in the first embodiment. Therefore, explanation of the basic configuration and the basic control method is omitted.

Figure 8:
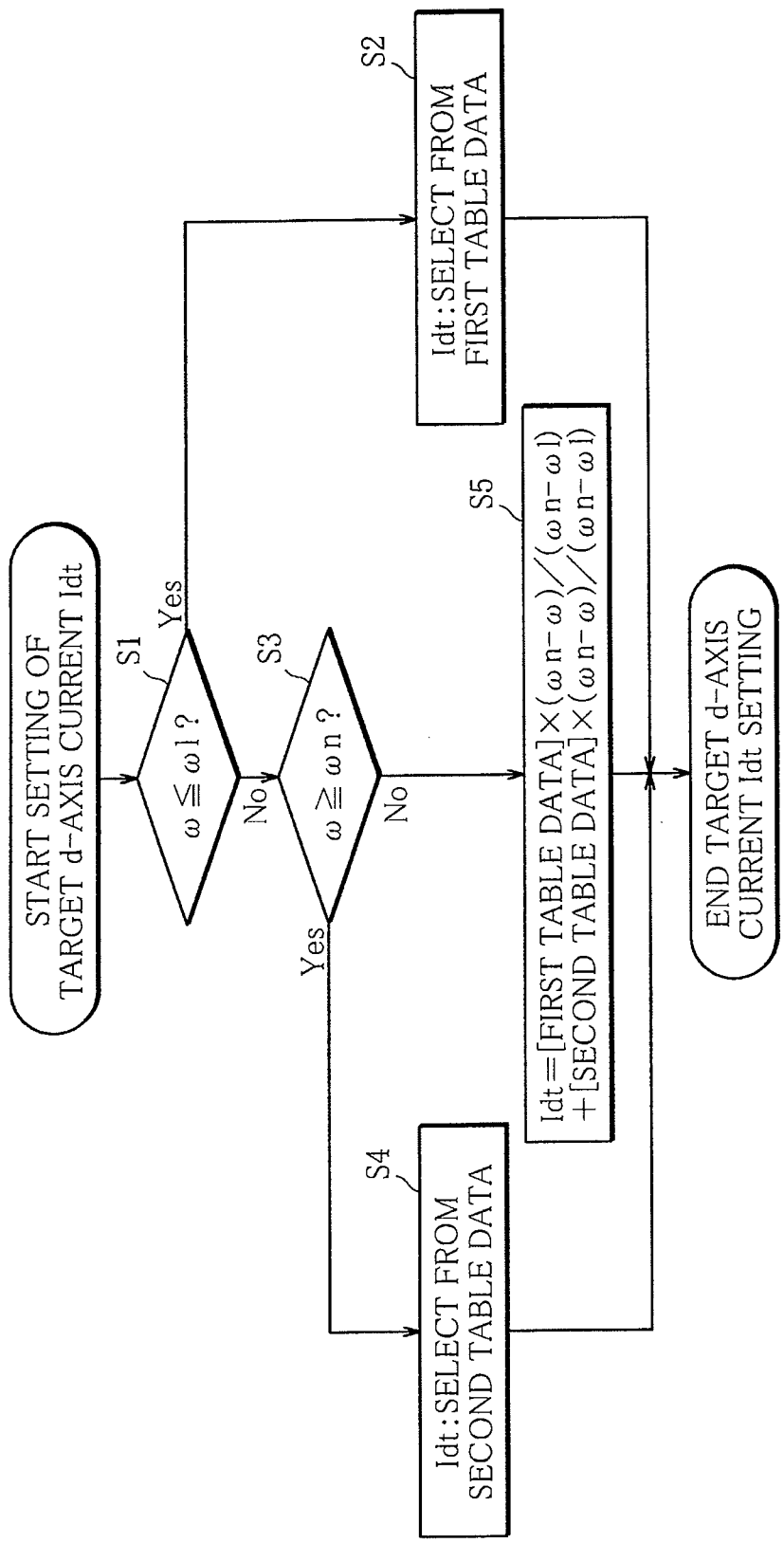
FIG. 8 is a flowchart for explaining a method of setting a target current phase according to a second embodiment of the present invention.

As shown in FIG. 8, first, when setting of the target d-axis current Idt is started, in step S1, the motor control device determines whether the number of revolutions $\omega$ is equal to or smaller than the low revolution number range $\omega l$ (e.g., 500 rpm). When a determination result is true (Yes) and the number of revolutions $\omega$ is equal to or smaller than the low revolution number range $\omega l$, the motor control device shifts to step S2. When the determination result is false (No) and the number of revolutions $\omega$ is larger than the low revolution number range $\omega l$, the motor control device shifts to step S3.

In step S2, the motor control device applies a first table in which the data of the target d-axis current Idt corresponding to the current vector locus of the target current phase forming the target current phase line L1 shown in FIG. 6 is stored and selects the target d-axis current Idt. The motor control device ends the setting of the target d-axis current Idt and the target current phase.

In step S3, the motor control device determines whether the number of revolutions w is equal to or larger than the steady revolution number range $\omega n$ (e.g., 2500 rpm). When a determination result is true (Yes) and the number of revolutions $\omega$ is equal to or larger than the steady revolution number range $\omega n$, the motor control device shifts to step S4. When the determination result is false (No) and the number of revolutions $\omega$ is smaller than the steady revolution number range $\omega n$, the motor control device shifts to step S5.

In step S4, the motor control device applies a second table in which the data of the target d-axis current Idt corresponding to the current vector locus of the target current phase forming the target current phase line L1 shown in FIG. 7 is stored and selects the target d-axis current Idt. The motor control device ends the setting of the target d-axis current Idt and the target current phase.

In step S5, the motor control device calculates the target d-axis current Idt by performing interpolation processing between the data stored in the first and second tables.

Specifically, the motor control device performs a calculation by the following general interpolation processing formula Idt=[data of the first table]$\times(\omega n-\omega)/(\omega n-\omega l)$+[data of the second table]$\times(\omega-\omega l)/(\omega n-\omega l)$ and sets a result of the calculation as the target d-axis current Idt. The motor control device ends the setting of the target d-axis current Idt and the target current phase.

As explained above, in this embodiment, the data table is configured from the first table and the second table corresponding to the number of revolutions of the motor 1. Consequently, it is possible to generate, according to the number of revolutions of the motor 1, the data table to be divided into a region where a current phase obtained by adding a phase difference to a current phase set by the maximum torque/current control is set as the target current phase and a region where a current phase set by the maximum torque/current control is directly set as the target current phase with the phase difference set to zero. It is possible to suitably reduce generation costs for the data table by correcting data only in a necessary region.

The target d-axis current Idt and the target current phase are calculated and set according to interpolation processing based on respective data of the first and second tables. Consequently, it is possible to suitably accurately detect the target current phase even when the number of revolutions of the motor 1 is present in a region between the two data tables.

The embodiments of the present invention are explained above. However, the present invention is not limited to the embodiments and can be variously changed without departing from the spirit of the present invention.

For example, in the embodiment, the actual current phase lines L2 and L3 are defined taking into account the fact that Vdc, Vqc, Idc, and Iqc of the axial position error estimation expression of Expression 2 are parameters including the individual difference of the inverter 2 and $\Phi a$ of the d and q-axis current relational expression of Expression 1 and Lq, Ld, and r of the axial position error estimation expression are the machine constants of the motor 1 and are parameters including the individual difference of the motor 1. However, the present invention is not limited to this. Action and effects same as those explained above can be obtained when the actual current phase lines L2 and L3 are defined by at least any one of these parameters and the data table used in the target current phase setting unit 14 is generated.

REFERENCE SIGNS LIST

1 Permanent magnetic synchronous motor
2 Inverter
10 Rotor position detecting unit (Rotor position detecting means)
12 Revolution number detecting unit (Revolution number detecting means)
22 Phase voltage setting unit (Phase voltage setting means)

The invention claimed is:

1. A motor control device that detects a rotor position of a permanent magnetic synchronous motor through sensorless control, the motor control device comprising:
   an inverter configured to detect an electric current flowing through a coil of the motor;
   a Pulse Width Modulation (PWM) signal generating unit that is configured to detect, via the inverter, a voltage applied to the coil of the motor;
   a rotor position detecting unit configured to detect:
      a current phase, a current peak value and an induced voltage phase on the basis of the electric current detected by the inverter and the voltage detected by the PWM signal generating unit, and
      the rotor position on the basis of the detected current phase, the detected current peak value, and the detected induced voltage phase;
   a target current phase setting unit configured to:
      set a target current phase on the basis of the current phase detected by the rotor position detecting unit, and
      set a target current in a current vector control based on the rotor position detected by the rotor position detecting unit;
   a revolution number detecting unit configured to:
      set a number of revolutions of the motor on the basis of the rotor position detected by the rotor position detecting unit, and
      detect a revolution number difference between the detected number of revolutions and a target number of revolutions instructed for the motor;
   a voltage peak value detecting unit that is configured to detect an applied voltage peak value of a voltage applied to the coil, on the basis of the revolution number difference detected by the revolution number detecting unit; and
   a phase voltage setting unit that is configured to set a target voltage on the basis of the target current phase set by the target current phase setting unit and the applied voltage peak value detected by the voltage peak value detecting unit, wherein
   the phase voltage setting unit:
      defines an actual current phase region including a current phase error range based on parameters to which is added an individual difference of at least any one of the motor and the inverter,
      defines a stable operation current phase region in which the rotor position can be detected through the sensorless control, and
      sets, as the target current, an electric current obtained by adding a predetermined phase difference corresponding to the number of revolutions detected by the revolution number detecting unit to an electric current set by the current vector control such that the actual current phase region is within the stable operation current phase region.

2. The motor control device according to claim 1, wherein the phase voltage setting unit includes a data table for enabling the target current to be selected using the number of revolutions detected by the revolution number detecting unit as a parameter.

3. The motor control device according to claim 2, wherein the data table used in the phase voltage setting unit includes a first table applied when the number of revolutions detected by the revolution number detecting unit is equal to or smaller than a predetermined low revolution number range and a second table applied when the number of revolutions detected by the revolution number detecting unit is equal to or larger than a predetermined steady revolution number range.

4. The motor control device according to claim 3, wherein the phase voltage setting unit calculates and sets a target current phase according to interpolation processing based on respective data of the first and second tables when the number of revolutions detected by the revolution number detecting unit is larger than the predetermined low revolution number range and smaller than the predetermined steady revolution number range.

5. The motor control device according to claim 1, wherein the parameters to which the individual difference of at least any one of the motor and the inverter is added include at least any one of the electric current detected by the inverter, the voltage detected by the PWM signal generating unit, a permanent magnet magnetic flux of the motor, inductance, and winding resistance of the coil.

6. The motor control device according to claim 1, wherein the current vector control is maximum torque/current control, which includes setting, as the target current, an electric current with which generated torque of the motor is maximized with respect to the electric current detected by the inverter.

* * * * *